(12) United States Patent
Holloway et al.

(10) Patent No.: US 11,229,983 B2
(45) Date of Patent: Jan. 25, 2022

(54) APPARATUS AND METHOD FOR ASSESSING THE BEAM PROFILE OF A NON-CONTACT TOOL SETTING APPARATUS

(71) Applicant: RENISHAW PLC, Wotton-under-Edge (GB)

(72) Inventors: Alan James Holloway, Swindon (GB); Benjamin Jason Merrifield, Stoke Bishop (GB); Edward Benjamin Egglestone, Bristol (GB)

(73) Assignee: RENISHAW PLC, Wotton-under-Edge (GB)

( * ) Notice: Subject to any disclaimer, the term of this patent is extended or adjusted under 35 U.S.C. 154(b) by 0 days.

(21) Appl. No.: 16/637,021

(22) PCT Filed: Aug. 31, 2018

(86) PCT No.: PCT/GB2018/052474
§ 371 (c)(1),
(2) Date: Feb. 6, 2020

(87) PCT Pub. No.: WO2019/048834
PCT Pub. Date: Mar. 14, 2019

(65) Prior Publication Data
US 2020/0198081 A1     Jun. 25, 2020

(30) Foreign Application Priority Data

Sep. 5, 2017 (EP) ..................................... 17189509

(51) Int. Cl.
*B23Q 17/24* (2006.01)
*G01J 1/42* (2006.01)
*G02F 1/11* (2006.01)

(52) U.S. Cl.
CPC ........ *B23Q 17/2485* (2013.01); *G01J 1/4257* (2013.01); *G02F 1/113* (2013.01); *G01J 2001/4261* (2013.01)

(58) Field of Classification Search
CPC ............. G01J 1/4257; G01J 2001/4261; G01J 2001/0437; B23Q 17/24; B23Q 17/2485;
(Continued)

(56) References Cited

U.S. PATENT DOCUMENTS

| 5,078,491 | A | | 1/1992 | Johnston, Jr. | |
|---|---|---|---|---|---|
| 5,459,565 | A | * | 10/1995 | Aharon ..................... | G01J 1/04 356/121 |

(Continued)

FOREIGN PATENT DOCUMENTS

| WO | 01/20277 A1 | 3/2001 |
|---|---|---|
| WO | 2009/132760 A1 | 11/2009 |

OTHER PUBLICATIONS

Mar. 16, 2018 Extended Search Report issued in European Patent Application No. 17189509.7.

(Continued)

*Primary Examiner* — Hoa Q Pham
(74) *Attorney, Agent, or Firm* — Oliff PLC

(57) ABSTRACT

A method assesses the beam profile of a light beam of a non-contact tool setting apparatus, the apparatus including a transmitter for emitting the light beam and a receiver for receiving the light beam. The receiver generates a beam intensity signal describing the intensity of received light. The apparatus is mounted to a machine tool having a spindle that is moveable relative to the non-contact tool setting apparatus. The method includes loading an object having an edge into the spindle of the machine tool and using the machine tool to move the spindle relative to the apparatus so that the edge of the object passes through the light beam. The (Continued)

beam profile of the light beam is then determined using the beam intensity signal generated at a plurality of positions during the step (ii) of moving the edge of the object through the light beam.

16 Claims, 3 Drawing Sheets

(58) Field of Classification Search
CPC ...... B23K 26/705; B23K 26/08; G01B 11/08; G01B 11/24; G01B 11/2433
USPC .................................. 356/121–123, 601–623
See application file for complete search history.

(56) References Cited

U.S. PATENT DOCUMENTS

| | | | |
|---|---|---|---|
| 5,909,274 A * | 6/1999 | Stucchi | G01J 1/4257 356/121 |
| 6,496,273 B1 | 12/2002 | Stimpson et al. | |
| 6,559,934 B1 * | 5/2003 | Yee | A61F 9/00814 356/121 |
| 7,456,949 B2 * | 11/2008 | Somani | A61F 9/008 250/252.1 |
| 11,110,563 B2 * | 9/2021 | Merrifield | G01B 11/08 |
| 2003/0060919 A1 * | 3/2003 | Stimpson | G01B 11/27 700/159 |
| 2005/0024650 A1 * | 2/2005 | Stimpson | G01V 8/12 356/614 |
| 2005/0167619 A1 * | 8/2005 | Stimpson | B23Q 17/24 250/559.14 |
| 2009/0051933 A1 * | 2/2009 | Stimpson | G01B 11/024 356/614 |
| 2011/0075698 A1 | 3/2011 | Scholich-Tessmann et al. | |
| 2012/0314210 A1 * | 12/2012 | Wick, Jr. | G01J 1/4257 356/121 |
| 2016/0045980 A1 | 2/2016 | Asano et al. | |
| 2020/0180095 A1 * | 6/2020 | Egglestone | B23Q 17/10 |

OTHER PUBLICATIONS

Oct. 9, 2018 International Search Report issued in International Patent Application No. PCT/GB2018/052474.

Oct. 9, 2018 Written Opinion of the International Searching Authority issued in International Patent Application No. PCT/GB2018/052474.

* cited by examiner

APPARATUS AND METHOD FOR ASSESSING THE BEAM PROFILE OF A NON-CONTACT TOOL SETTING APPARATUS

The present invention relates to non-contact tool setting apparatus. In particular, the present invention relates to an improved technique for assessing the beam profile, such as the beam width, of the light beam of a non-contact tool setting apparatus.

Break-beam tool setting devices for use on machine tools are known, for example see U.S. Pat. No. 6,496,273. Tool setting apparatus of this type includes a light source which generates a beam of light which is passed to a detector. During a tool setting operation, the machine tool is operated to move a tool into and out of the light beam. Interruption of the light beam by the tool is detected and the apparatus generates a so-called trigger signal whenever the light beam is obscured by a certain amount. This allows the position of a part of a tool to be established. In addition to establishing the position of a part of a tool (e.g. a tool tip or edge), tool setting apparatus can also be used to measure the length and/or diameter of tools and to monitor tool breakage or wear.

The working volumes of machine tools in which non-contact tool setting apparatus are mounted are typically very dirty environments. There is usually coolant, swarf and other contaminants present that can partially obscure or otherwise affect the quality of the laser beam, thereby reducing measurement accuracy. This can introduce the need for regular preventative maintenance to clean the tool setting apparatus, but frequently cleaning the apparatus has the disadvantage of increasing the amount of machine tool downtime. The present inventors have found that various changes (e.g. thermal growth, laser wavelength changes etc) can affect the width of the laser beam emitted from the tool setting device. This means that, in practice, the beam width of tool setting apparatus can change during use thereby reducing the reliability and accuracy of tool measurements.

According to a first aspect of the present invention, a method is provided for assessing a beam profile of a light beam of a non-contact tool setting apparatus, the non-contact tool setting apparatus comprising a transmitter for emitting the light beam and a receiver for receiving the light beam, the receiver generating a beam intensity signal describing the intensity of received light, the non-contact tool setting apparatus being mounted to a machine tool having a spindle that is moveable relative to the non-contact tool setting apparatus, the method comprising the steps of;

(i) loading an object having an edge into the spindle of the machine tool, and (ii) using the machine tool to move the spindle relative to the non-contact tool setting apparatus so that the edge of the object passes through the light beam, characterised by the step of (iii) determining the beam profile of the light beam using the beam intensity signal generated at a plurality of positions during the step (ii) of moving the edge of the object through the light beam.

The first aspect of the present invention thus relates to a method for measuring a beam profile (e.g. a beam width) of a non-contact tool setting apparatus when it is mounted to a machine tool. The non-contact tool setting apparatus comprises a break-beam type tool detection system in which a light beam (e.g. a laser beam) emitted from the transmitter (e.g. by a laser diode of the transmitter) is passed through a region of free space to the receiver. The light beam generated by the transmitter has a certain beam profile, for example it has a certain beam diameter and intensity distribution in the case of a circular cross-section beam. The receiver detects (e.g. using a photodiode) the received light and generates a beam intensity signal describing the intensity of the received light.

The method comprises a step (i) of loading an object having an edge into the spindle of the machine tool. The object may be an artefact (e.g. a calibration pin), a tool or any other item having a well-defined edge. A step (ii) comprises using the machine tool to move the spindle (i.e. the spindle holding the object) relative to the non-contact tool setting apparatus so that the edge of the object passes through the light beam. In other words, the machine tool which holds the object is programmed to drive the edge of the object relative to the light beam so that it moves into, or out of, the light beam. This movement through the light beam causes a change in the beam intensity signal that is generated by the receiver because the amount of the light beam being obscured by the object is altered by the object movement. It should be noted that the measurement process may comprise the object being moved into the beam (a so-called "light-to-dark" measurement) or out of the beam (a so-called "dark-to-light" measurement).

The invention is characterised by the step (iii) of determining the beam profile of the light beam using the beam intensity signal generated at a plurality of positions during the step (ii) of moving the edge of the object through the light beam. In other words, the different beam intensity signals that occur when the single edge of the object is located at different positions within the light beam are used to determine the beam profile. It should be noted that the method of determining the beam profile may comprise fully characterising the beam profile (e.g. by performing a high-resolution profiling procedure in which the edge is moved through the light beam from multiple directions) or only determining a certain characteristic of the beam profile (e.g. the beam diameter, symmetry or shape etc). Various assumptions may also be made when determining the beam profile, such as the light beam being symmetrical etc. The term beam profile as used herein should thus be understood to include any one or more characteristics of the beam profile (such as the beam width or an inferred lateral beam extent that indicates beam width). As explained below, the beam profile may be assessed by capturing the beam intensity signal at multiple object positions or by assessing when the beam intensity signal reaches each of a plurality of different threshold values.

The present invention can thus use beam intensity values of any object (e.g. a tool) having an edge (e.g. a straight edge) to determine the beam width. The beam width may be measured in multiple directions (using different edges of the object if necessary) and/or compared to previously measured values. This allows beam width to be checked regularly (e.g. prior to each measurement) and quickly (i.e. there is no need to load a specific calibration pin into the machine tool spindle). This means there is minimal disruption to the production process.

Advantageously, the beam profile determined in step (iii) comprises the beam width. The beam profile found in step (iii) may comprise the beam symmetry. A direct measurement of beam profile may be determined (e.g. a beam width in millimetres). Conveniently, an indirect measurement of beam profile is determined. For example, a value or relative measure of beam profile may be determined, such a factor or value relating to the beam width. In other words, the beam profile determined in step (iii) may be a calibrated beam profile measurement or it may be a factor that is related to the beam profile (such as a characteristic of the beam profile) being measured.

Advantageously, step (iii) comprises recording a plurality of beam intensity values that describe the beam intensity signal at a plurality of positions of the spindle relative to the non-contact tool setting apparatus during step (ii). In other words, the value of the beam intensity signal is periodically recorded (i.e. at multiple positions) during the movement of the object edge through the light beam. Preferably, the object is moved relative to the light beam at a constant feed-rate (i.e. at a constant speed). A set of beam intensity values as a function of the position of the object edge relative to the light beam are thereby collected. In other words, a beam intensity data set is collected that comprises a plurality of beam intensity values that describe the beam intensity signal as a function of the position of the edge of the object relative to the light beam. These beam intensity values can then be analysed to extract the beam profile (e.g. beam width) information.

Advantageously, the step of determining the beam profile comprises fitting a mathematical function to the plurality of beam intensity values. In other words, the beam intensity values may be described by a mathematical function. The mathematical function may describe the expected (e.g. s-shaped) beam intensity profile. For example, the mathematical function may be a polynomial function (e.g. a second, third or higher order polynomial function). In one embodiment, the mathematical function is a linear function. The mathematical function may be fitted to only a subset of the collected beam intensity values. For example, a linear function may be fitted to the beam intensity values within a certain beam intensity range (e.g. those beam intensity values of the approximately linear centre section of an s-shaped profile). In one embodiment, only the beam intensity values within a range of 10% to 90% of the beam clear intensity are fitted to the mathematical (e.g. linear) function. The skilled person would appreciate that the mathematical function that is used will affect the accuracy with which the beam profile is determined and would thus select a mathematical function accordingly.

As mentioned above, a linear function may be fitted to at least some of the beam intensity values. Advantageously, the line obtained by fitting the linear function to the beam intensity values is extrapolated, or interpolated, to determine a plurality of positions of the object that correspond to different (e.g. upper and lower) beam signal intensities. The difference between the plurality of positions may then provide a value indicative of the beam width. Conveniently, the linear function is extrapolated, or interpolated, to determine first and second positions of the object that correspond to different percentages (e.g. 10% and 90%) of the beam clear intensity. The spatial separation of the first and second positions may then provide a factor or value that is related to the beam width.

Instead of recording multiple beam intensity values, the beam intensity signal may be compared to a plurality of different intensity thresholds (e.g. 90% and 10% intensity thresholds may be used). Conveniently, step (iii) comprises determining a plurality of positions of the spindle relative to the object when the beam intensity signal crosses a plurality of different intensity thresholds. The beam profile (e.g. beam width) may then be determined from the plurality of positions. Information relating to the crossing of the different intensity thresholds may be communicated to the numerical controller of the machine tool (e.g. by issuing appropriate trigger signals) to allow the beam profile to be determined by the controller. Alternatively, the beam profile may be calculated and stored within the non-contact tool setting apparatus. If beam profile information is stored within the tool setter, then such information may be used when the apparatus is subsequently used to measure a tool; e.g. to compensate for variations in the beam profile (e.g. beam width) that might otherwise degrade measurement accuracy.

Advantageously, step (ii) comprises moving the spindle relative to the non-contact tool setting apparatus at a substantially constant speed (i.e. feed-rate). The speed at which the spindle is moved relative to the non-contact tool setting apparatus may be known. If the speed is known, then the position of the object may be inferred from the time at which the beam intensity signal was generated. The spindle may be moved relative to the non-contact tool setting apparatus along a linear path.

As mentioned above, the edge of the object may be moved in to the light beam to obscure the beam. Step (ii) may thus comprise moving the edge into the light beam from outside the light beam. This arrangement is termed a "light-to-dark" measurement. It is also possible to start the measurement with the object fully obscuring the light beam and to move the edge of the object clear of the light beam. This arrangement is termed a "dark-to-light" measurement.

The light beam may have any profile. For example, the light beam may have a Gaussian profile. The light beam may thus have a substantially circular or elliptical cross-section. In this case, the beam width can also be called the beam diameter. As mentioned above, the beam width or beam diameter that is obtained using the present method may be any value or measure that provides an indication of the beam width or diameter. It is also possible for certain assumptions to be made about the beam profile (e.g. that it is circular or elliptical). Advantageously, the beam width is measured in the direction along which tools will subsequently be moved into the beam for tool measurement purposes.

The measurement of beam profile may be repeated one or more times. The repeated measurements may comprise moving the object through the beam in a plurality of different directions (e.g. along different tool paths). In this manner, the beam profile may be measured (sampled) in different directions. In other words, steps (ii) and (iii) are conveniently repeated with the object being moved through the beam in different directions to allow the beam profile to be determined along a plurality of directions. In this manner, it is possible to check the circularity of a light beam (e.g. by measuring the beam width along vertical and horizontal directions). The skilled person would select the number and direction of measurements taken based on their requirements. In many cases, a single measurement of beam width would be sufficient (e.g. if it can be assumed to a good approximation that the beam profile is circular). At the other extreme, multiple (e.g. more than 5, more than 10 or more than 50) measurements of beam profile may be taken by moving the object through the beam in a many different directions (e.g. from many different angles). These measurements can be used to build up a detailed beam profile, e.g. to provide high spatial resolution beam profiling (as per tomography).

The present method may also be repeated to allow the profile of the light beam to be measured at multiple points along its length. In other words, steps (ii) and (iii) may be repeated so as to measure the profile (e.g. width) of the light beam at multiple points along the length of the light beam. This may allow the profile of a focussed beam to be measured; e.g. to find the focus of the beam. Advantageously, the light beam comprises a substantially collimated light beam. The profile (e.g. width) of the collimated beam may be measured at a plurality of points along its length to verify the necessary amount of collimation is present.

Conveniently, the beam profile determined in step (iii) is compared with a previously determined beam profile. Any significant changes in beam profile (e.g. a certain percentage change in beam width) may indicate the apparatus requires user attention (e.g. for cleaning or recalibration). A warning may be provided to a user if any such changes in beam width occur or the machine tool may be programmed to enter an error mode and stop further machining actions. An unacceptable level of change in the beam profile may be defined by taking into account the measurement specifications of the non-contact tool setting apparatus. For example, the warning may be issued when the beam width has changed by an amount that means measurement accuracy has dropped below an acceptable level.

According to a second aspect of the invention, there is provided an apparatus for performing non-contact tool measurement on a machine tool, comprising; a transmitter for emitting a light beam having a beam width, and a receiver for receiving the light beam and generating a beam intensity signal describing the intensity of light received at the receiver, characterised in that the apparatus comprises a beam profile (e.g. beam width) measurement module for analysing the beam intensity signal that results when the edge of an object is moved through the light beam, the beam profile being determined from the beam intensity signal that occurs at a plurality of positions during movement of the edge of the object through the light beam.

The apparatus may also comprise a trigger unit for analysing the variation in the beam intensity signal that occurs when a tool having a nominal tool diameter is moved through the light beam, the trigger unit generating a trigger signal when the beam intensity signal crosses a trigger threshold. The trigger signal may be usable by the machine tool to determine a tool size. The beam width may be taken into account when the tool size is determined. The apparatus may also include any one or more features described above in the context of the analogous method.

Also described herein is a method for assessing the beam profile of a light beam of a non-contact tool setting apparatus, the non-contact tool setting apparatus comprising a transmitter for emitting the light beam and a receiver for receiving the light beam, the receiver generating a beam intensity signal describing the intensity of received light, the non-contact tool setting apparatus being mounted to a machine having a spindle that is moveable relative to the non-contact tool setting apparatus, the method comprising the steps of; (i) loading an object into the spindle of the machine, (ii) using the machine to move the spindle relative to the non-contact tool setting apparatus so that the object passes through the light beam, and (iii) determining the beam profile of the light beam using the beam intensity signal generated at a plurality of positions during the step (ii) of moving the object through the light beam. The object may be an artefact having a known size. The artefact may be a calibration pin of known size. The calibration pin may be smaller than the width of the light beam. The artefact may comprise an optical element. For example, a slit or chrome lines on a transparent carrier. An artefact having a small aperture or opaque region (e.g. a pin-hole) may also be used. The object may be passed completely through the beam (e.g. from one side to the other). Only an edge of the object may be moved into (or out of) the beam or both edges may be moved through the beam. The beam profile may be the beam width. The machine may be a coordinate positioning apparatus (e.g. a robot, coordinate measuring machine etc). The machine may be a machine tool. The method may comprise any one or more of the various features described herein.

The invention will now be described, by way of example only, with reference to the accompanying drawings in which.

Figure 1:
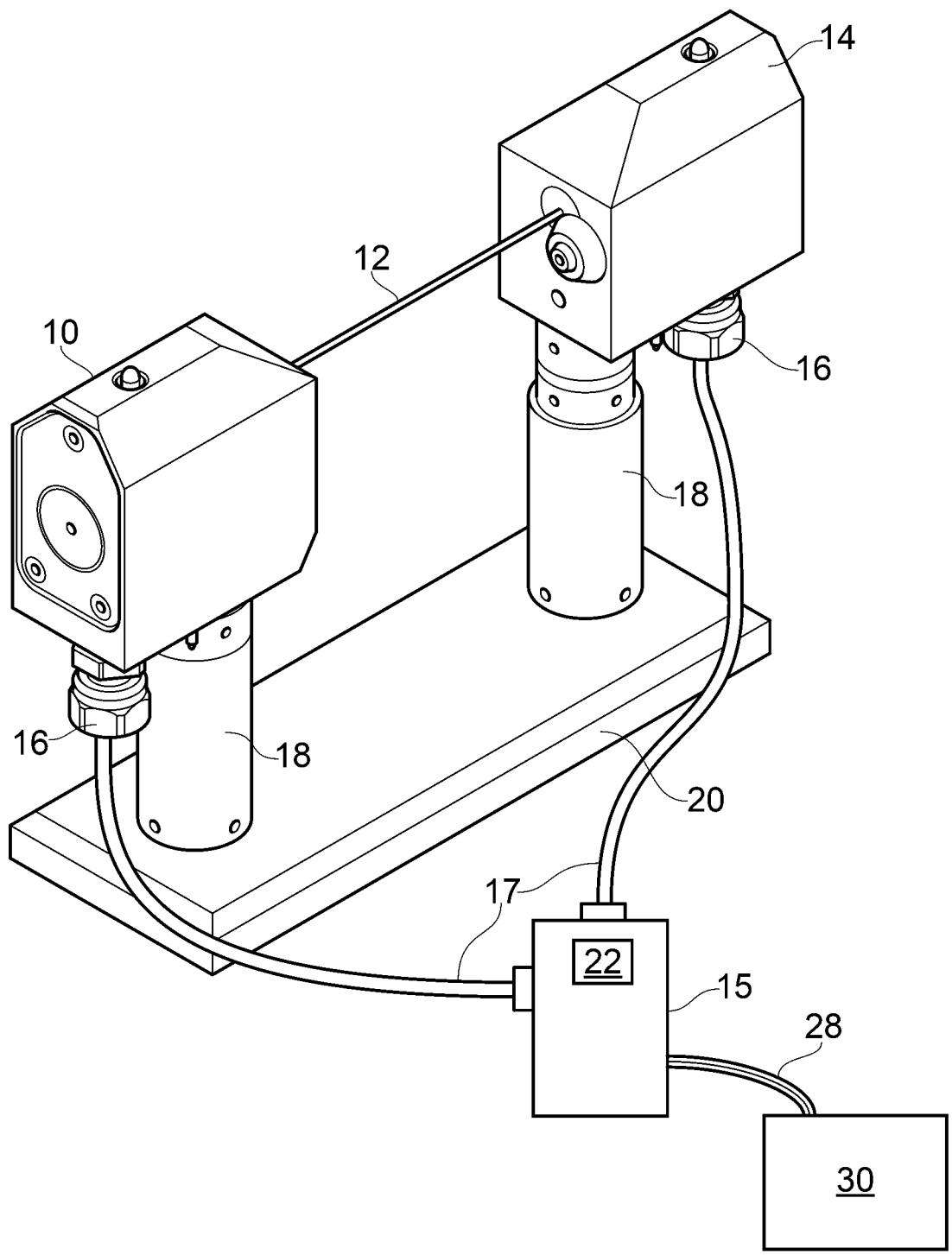
FIG. 1 shows a non-contact tool setting apparatus of the present invention.

Referring to FIG. 1, a tool setting apparatus of the present invention is illustrated. The apparatus comprises a transmitter 10 for generating a beam of light 12. The transmitter 10 includes a laser diode and suitable optics (not shown) for generating the beam of light 12. A receiver 14 is also illustrated for receiving the beam of light 12. The receiver comprises a photodiode (not shown) for detecting the beam of light 12.

The transmitter 10 and receiver 14 are both affixed to a common base 20 by pillars 18. This arrangement ensures the transmitter 10 and receiver 14 maintain a fixed spacing and orientation relative to one another. The base 20 may then be mounted directly to the bed, or indeed any appropriate part, of a machine tool. It should also be noted that various alternative structures for mounting the transmitter and receiver could be used. For example, a common housing for the transmitter and receiver could be provided or discrete transmitter and receiver units could be separately mounted to the machine tool.

The apparatus also comprises an interface 15 connected to the transmitter 10 and receiver 14 via electrical cables 17. The interface 15 provides electrical power to the transmitter 10 and receiver 14 and also receives a beam intensity signal from the photodiode detector of the receiver 14. The interface 15 also comprises a trigger circuit 22 that monitors the beam intensity signal it receives from receiver 14 and issues a trigger signal to an associated machine tool 30 when the beam intensity signal crosses a trigger threshold.

Prior to use in a tool measurement operation, for example during a set-up or installation process, the transmitter 10 and receiver 14 are aligned relative to one another to maximise the intensity of light falling on the photodiode of the receiver 14. A variable gain amplifier associated with the receiver is then adjusted so that the beam intensity signal takes a value of 5 v in the absence of any blockage of the beam (i.e. with the apparatus in the so-called "beam clear" condition). This 5 v beam intensity signal is thus set as a reference beam intensity level. The trigger threshold is then set at 2.5 v (i.e. at fifty percent of the reference beam intensity level). Passing an object into the light beam 12 will result in a trigger signal being issued when the beam intensity signal drops below 2.5 v. This trigger signal can thus be used to indicate that an object (e.g. a tool) has attained a certain position relative to the laser beam 12.

Figure 2:
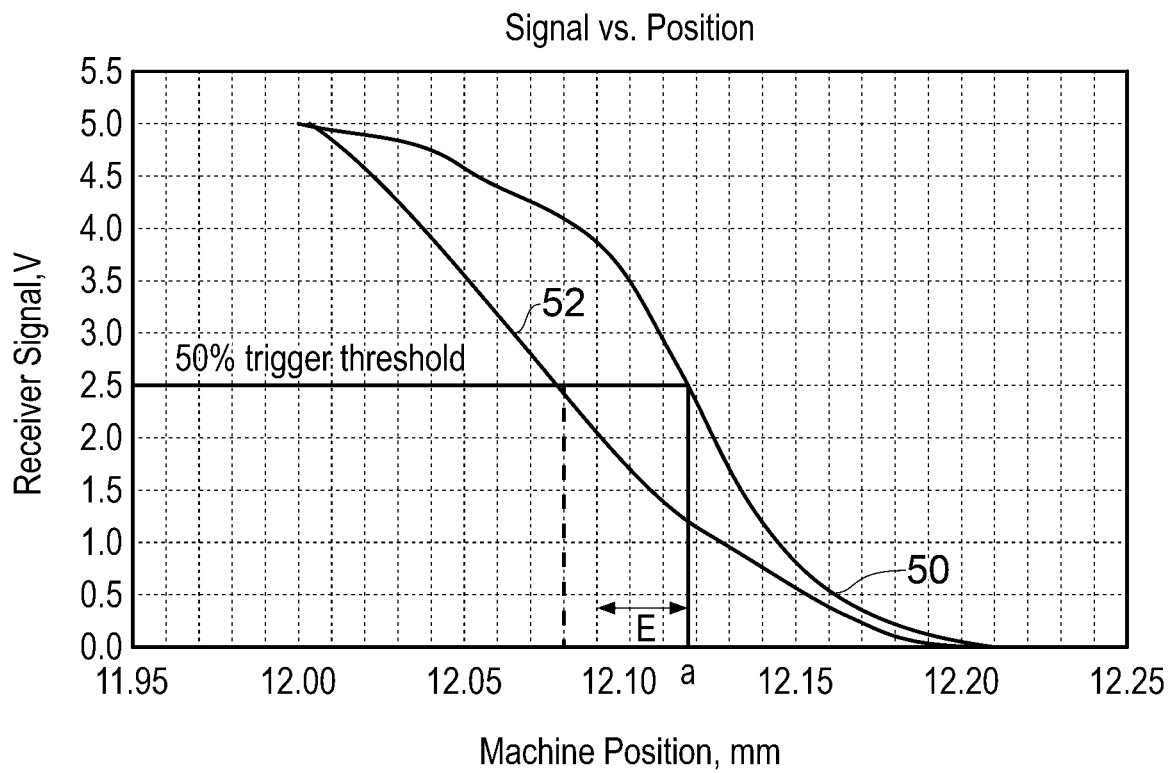
FIG. 2 shows the signal generated by the detector of the receiver unit as an object is passed through the light beam of the tool setting apparatus.

FIG. 2 shows how passing a solid (calibration) pin having an 8 mm diameter into the light beam causes a reduction in the beam intensity signal. In particular, the graph of FIG. 2 shows the variation in beam intensity signal (plotted on the y-axis) as a function of the position of the pin as measured by the machine tool (plotted on the x-axis) when the calibration pin is traversed into the light beam along a direction perpendicular to the axis of the light beam. In the absence of any blockage of the light beam (i.e. the so-called "beam-clear" condition) the beam intensity signal takes a value of approximately 5 v and this reduces to 0 v when the beam is fully blocked following a s-shaped curve 50. The use of the 2.5 v (50%) trigger threshold can be seen to give a trigger position for the pin of 12.117 mm.

Figure 3:
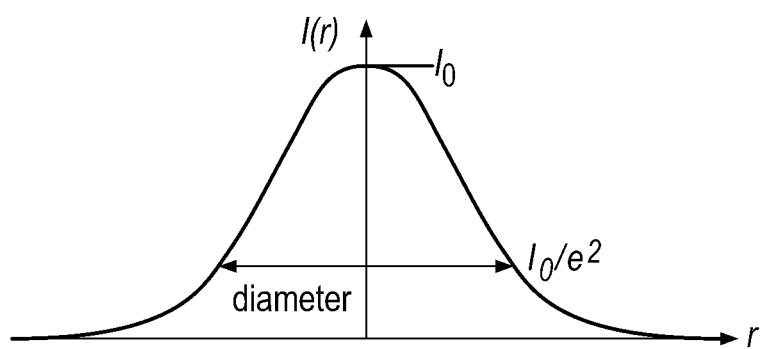
FIG. 3 shows the width of a laser beam.

FIG. 3 shows the profile of the light beam 12 that is described with reference to FIG. 1. The intensity distribution of the beam has a Gaussian profile with a beam diameter of $1/e^2$. The s-shaped curve 50 shown in FIG. 2 is obtained when the calibration pin is passed into the Gaussian shaped beam shown in FIG. 3. If the profile of the beam changes, for example due to contaminants or misalignment of the optical components, then the insertion of the calibration pin will have a different effect on the received light intensity. For example, the curve 52 shown in FIG. 2 might be obtained when inserting the pin into a different beam profile. This results in there being an error E in the measured trigger position of the pin. The user would typically be unaware that such an error had occurred and the error would result in an incorrect tool size being used by the machine tool.

The present invention provides a technique that allows the beam width (and/or another characteristic of the beam profile) to be measured quickly using the non-contact tool setting apparatus when mounted to a machine tool. This is done by loading an object (e.g. a calibration pin, artefact, tool or other object) into the spindle of the machine tool and moving an edge of the object into the laser beam 12. The beam intensity signal thus goes from a beam clear value to zero as the edge is moved so as to obscure the light beam. During movement of the object into the light beam, the beam intensity signal is recorded. In particular, a set of beam intensity values are collected during the edge motion.

Figure 4:
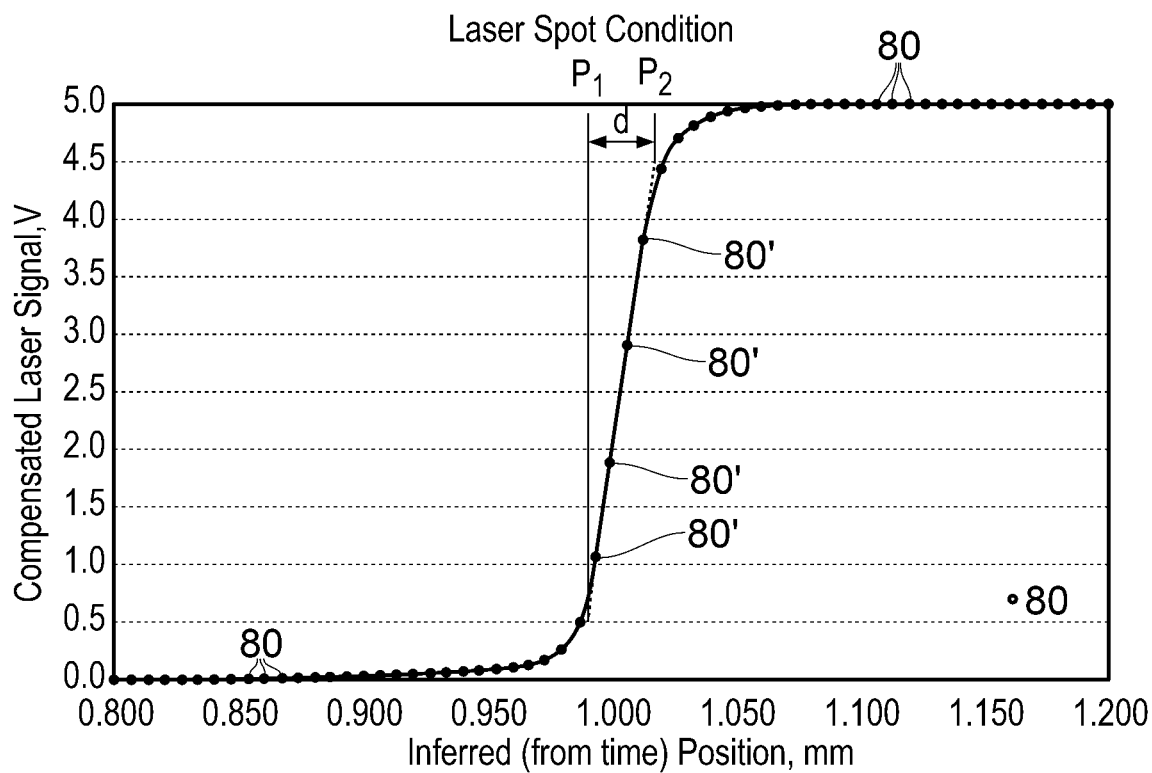
FIG. 4 shows beam intensity data fitted to a straight line.

FIG. 4 shows such a set of beam intensity values 80 plotted as a function of position of the object. It is noted that the actual position of the object's edge relative to the beam does not need to be known. It is also not necessary to extract spindle position data from the machine tool if the object is being moved at a constant, known, speed into the beam. Instead, object position can simply be inferred from the time at which the beam intensity values were recorded.

The beam intensity values of FIG. 4 follow the s-shaped curve mentioned above. In order to measure beam width, a subset of the beam intensity values 80 that lie on the substantially linear part of the s-shaped curve are analysed. In particular, a linear function is fitted to the beam intensity values 80'. The fitted straight line 82 is then extrapolated to the 10% and 90% (0.5V and 4.5V) beam intensity levels. The beam width "d" (i.e. a beam diameter value for a circular beam) is then obtained from the difference in the positions P1 and P2 at which the extrapolated line 82 crosses the 10% and 90% intensity levels. The beam width may be measured directly (e.g. the width may be established in millimetres etc) or the beam width measurement may be indirect and thereby comprise a factor that is related to beam width (e.g. a value that varies in relation to the beam width). Although a linear function is used in this example, a polynomial function (e.g. a second or third order polynomial) could also be used.

This technique is simple to implement and does not require any special calibration tool to be used (i.e. any object having an edge can be used). It is also possible to move the object into the beam from a plurality of different directions to allow different widths of the light beam to be found (e.g. the beam width in vertical and horizontal directions could be measured). The beam width measurements may also be compared to previous measurements of the same beam width to see if the beam size has changed (e.g. due to thermal growth or laser aging etc). This comparison may be used to flag that the apparatus need cleaning or maintenance.

Figure 5:
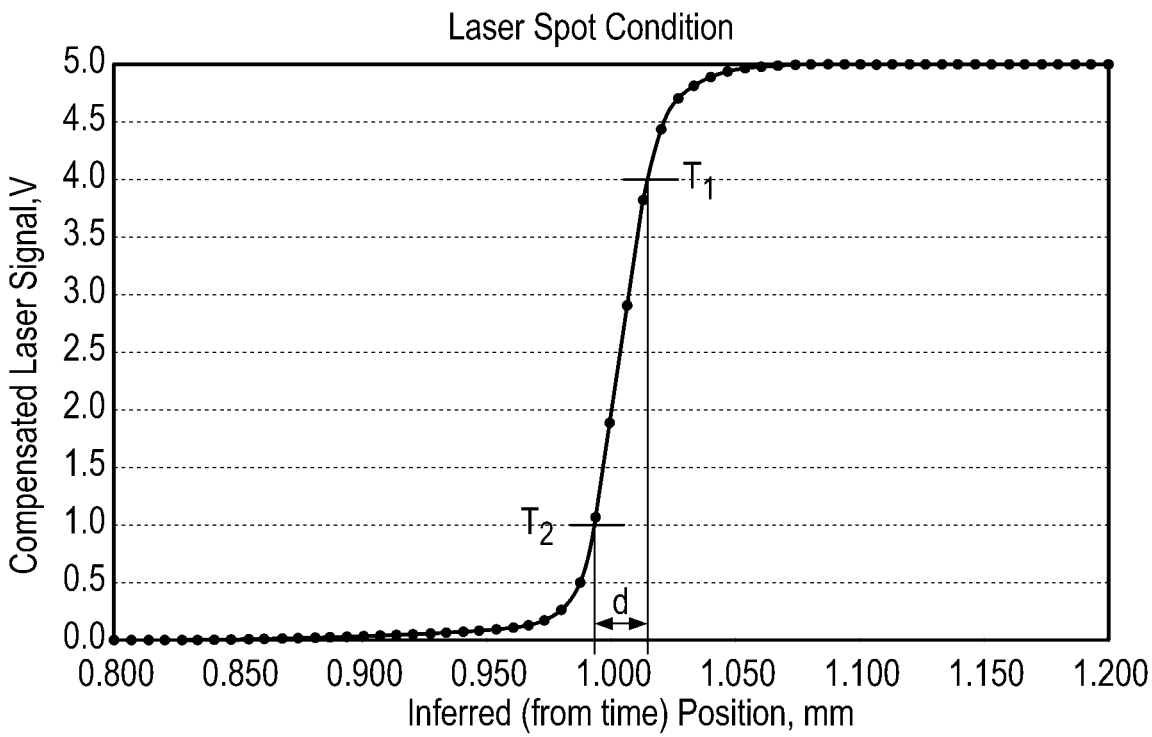
FIG. 5 shows two trigger threshold measurements being used to calculate beam width.

FIG. 5 shows an alternative embodiment. Instead of collecting many beam intensity data values, the apparatus may be configured to record when (and hence where) the beam intensity signal crosses two different intensity thresholds. This could be considered analogous to having an upper trigger threshold T1 (e.g. at 80% or 4V) and a lower trigger threshold T2 (e.g. at 20% or 1V). The inferred positions when the T1 and T2 thresholds are crossed can then be used to determine the beam width. Additional thresholds (T3, T4 etc) could be provided if required.

It should be noted that although the above examples describe "light-to-dark" measurements in which the edge is moved into the beam, it would also be possible to implement the method using a "dark-to-light" measurement in which the edge of the object initially blocks the beam and is moved out of the beam. The above examples describe measuring beam width, but it would also be possible to assess other features of the beam profile (e.g. beam symmetry etc). The skilled person would also be aware of the variants to the method that would be possible.

The invention claimed is:

1. A method for assessing a beam profile of a light beam of a non-contact tool setting apparatus, the non-contact tool setting apparatus comprising a transmitter for emitting the light beam and a receiver for receiving the light beam, the receiver generating a beam intensity signal describing the intensity of received light, the non-contact tool setting apparatus being mounted to a machine tool having a spindle that is moveable relative to the non-contact tool setting apparatus, the method comprising the steps of:
    (i) loading an object having an edge into the spindle of the machine tool, and
    (ii) using the machine tool to move the spindle relative to the non-contact tool setting apparatus so that the edge of the object passes through the light beam;
    (iii) determining the beam profile of the light beam using the beam intensity signal generated at a plurality of positions of the light beam relative to the edge during the step (ii) of moving the edge of the object through the light beam; and
    (iv) performing a tool measurement operation to measure a position of a part of a tool carried in the spindle of the machine tool,
    wherein the beam profile determined in step (iii) comprises a value indicative of the beam width.

2. A method according to claim 1, wherein step (iii) comprises recording a plurality of beam intensity values that describe the beam intensity signal at a plurality of positions of the spindle relative to the non-contact tool setting apparatus during step (ii).

3. A method according to claim 2, comprising the step of determining the beam profile by fitting a mathematical function to the plurality of beam intensity values.

4. A method according to claim 3, wherein the mathematical function is a linear function and the linear function is fitted to beam intensity values within a certain beam intensity range.

5. A method according to claim 4, wherein the line obtained by fitting the linear function to the beam intensity values is extrapolated or interpolated to determine first and second positions of the object that correspond to different percentages of the beam clear intensity, the spatial separation of the first and second positions providing the beam profile.

6. A method according to claim 3, wherein the mathematical function is a polynomial function of second or higher order.

7. A method according to claim 1, wherein step (iii) comprises determining a plurality of positions of the spindle relative to the object when the beam intensity signal crosses a plurality of different intensity thresholds, the beam profile being determined from the plurality of positions.

8. A method according to claim 1, wherein step (ii) comprises moving the spindle relative to the non-contact tool setting apparatus at a substantially constant speed.

9. A method according to claim 1, wherein step (ii) comprises moving the spindle relative to the non-contact tool setting apparatus at a known speed.

10. A method according to claim 1, wherein the light beam has a substantially circular cross-section.

11. A method according to claim 1, wherein steps (ii) and (iii) are repeated with the object being moved through the beam in different directions to allow the beam profile to be sampled along a plurality of directions.

12. A method according to claim 1, wherein steps (ii) and (iii) are repeated so as to measure the profile of the light beam at multiple points along the length of the light beam.

13. A method according to claim 1, wherein the beam profile determined in step (iii) is compared with a previously determined beam profile.

14. A method according to claim 1, wherein the tool carried in the spindle of the machine tool is the object.

15. A method according to claim 1, wherein step (iv) includes replacing the object loading into the spindle in step (i) with the tool, and then measuring the position of the part of the tool.

16. A method according to claim 15, wherein the object loaded into the spindle in step (i) is a calibration pin.

* * * * *